(12) United States Patent
Yun

(10) Patent No.: US 9,122,382 B2
(45) Date of Patent: Sep. 1, 2015

(54) METHOD FOR SELECTING TARGET AT TOUCH POINT ON TOUCH SCREEN OF MOBILE DEVICE

(75) Inventor: Yeo Min Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 172 days.

(21) Appl. No.: 13/347,290

(22) Filed: Jan. 10, 2012

(65) Prior Publication Data

US 2012/0182237 A1    Jul. 19, 2012

(30) Foreign Application Priority Data

Jan. 13, 2011    (KR) ........................ 10-2011-0003397

(51) Int. Cl.
*G09G 5/00*      (2006.01)
*G06F 3/0484*    (2013.01)
*G06F 3/0488*    (2013.01)

(52) U.S. Cl.
CPC ........ *G06F 3/04842* (2013.01); *G06F 3/04886* (2013.01)

(58) Field of Classification Search
CPC . G06F 3/0488; G06F 3/04883; G06F 3/0481; G06F 3/044; G06F 3/045; G06F 3/04817; G06F 3/0482; H04M 1/72522; H04M 1/72527; H04M 1/72519; H04M 1/72583
USPC ........... 345/156, 157, 173–178; 715/738, 773
See application file for complete search history.

(56) References Cited

U.S. PATENT DOCUMENTS

| | | | |
|---|---|---|---|
| 7,921,365 B2* | 4/2011 | Sauve et al. | 715/738 |
| 8,381,118 B2* | 2/2013 | Minton | 715/773 |
| 8,527,905 B2* | 9/2013 | Chen et al. | 715/853 |
| 2008/0172618 A1* | 7/2008 | Han | 715/738 |
| 2009/0096753 A1* | 4/2009 | Lim | 345/173 |
| 2010/0066695 A1* | 3/2010 | Miyazaki | 345/173 |
| 2011/0010668 A1* | 1/2011 | Feldstein et al. | 715/822 |
| 2011/0106439 A1* | 5/2011 | Huang et al. | 701/208 |
| 2013/0047100 A1* | 2/2013 | Kroeger et al. | 715/760 |

* cited by examiner

*Primary Examiner* — Jennifer Nguyen
(74) *Attorney, Agent, or Firm* — The Farrell Law Firm, P.C.

(57) ABSTRACT

A method for selecting a user's desired target from among a plurality of targets, at a touch point on a touch screen of a mobile device is provided. The method includes displaying a web page; checking a touch input at a touch point is received on the touch screen, a number of hyperlinks overlapped with the touch point in the displayed web page; enlarging, if at least two hyperlinks are overlapped with the touch point, defining a target area around the touch point, the target area, and displaying the enlarged target area; and selecting and visually emphasizing, if only a single one of the hyperlinks in the enlarged target area is overlapped with the touch point, the single hyperlink among the hyperlinks.

8 Claims, 13 Drawing Sheets

METHOD FOR SELECTING TARGET AT TOUCH POINT ON TOUCH SCREEN OF MOBILE DEVICE

PRIORITY

This application claims priority under 35 U.S.C. §119(a) to an application filed in the Korean Intellectual Property Office on Jan. 13, 2011, and assigned Ser. No. 10-2011-003397, the content of which is incorporated herein by reference.

BACKGROUND OF THE INVENTION

1. Field of the Invention

The present invention relates generally to a method for selecting a target at a touch point on a touch screen of a mobile device and, more particularly, to a method for selecting a user's desired target from among a plurality of targets, such as hyperlinks, Points of Interest (POIs) or local information items, at a touch point on a touch screen.

2. Description of the Related Art

Due to the dramatic advancement of electronic communication technologies, users have come to use a variety of functions offered in mobile phones. Unlike traditional mobile phones that allow only the use of predetermined functions, smart phones not only allow users to install and remove various applications, but also permit direct Internet access through wireless networks such as Wireless Fidelity (WiFi). Accordingly, market demands for smart phones have been rapidly increasing.

In Particular, a touch screen has become one of essential elements of a smart phone. When any touch event (i.e., a user's touch action on a touch screen through at least one finger or a stylus) from a user is input, a smart phone performs a particular function corresponding to a touch point. However, since such a touch point is relatively larger than the screen resolution, there is a likelihood that an undesired target may be mistakenly touched. Unfortunately, such mistaken touches may often require users to provide an exact touch. Although a user can touch an enlarged screen, such an enlargement may require complicated and troublesome manipulations.

SUMMARY OF THE INVENTION

Accordingly, the present invention is provided to address the above-mentioned problems and/or disadvantages and to offer at least the advantages described below.

An aspect of the present invention provides methods for selecting a user's desired target among a plurality of targets at a touch point on a touch screen.

According to one aspect of the present invention, provided is a method for selecting a target at a touch point on a touch screen of a mobile device, the method including displaying a web page; when there is a touch on the touch screen, checking the number of hyperlinks overlapped with the touch point in the displayed web page; if two or more hyperlinks are overlapped with the touch point, defining a target area around the touch point, enlarging the target area, and displaying the enlarged target area; and if a single one of the hyperlinks in the enlarged target area is overlapped with the touch point, selecting and visually emphasizing the single hyperlink among the hyperlinks.

According to another aspect of the present invention, provided is a method for selecting a target at a touch point on a touch screen of a mobile device, the method including displaying map information; when there is a touch on the touch screen, checking the number of POIs (points of interest) overlapped with the touch point in the displayed map information; if two or more POIs are overlapped with the touch point, enlarging and displaying the POIs overlapped with the touch point; if a single one of the enlarged POIs is overlapped with the touch point, selecting the single POI among the enlarged POIs; and setting a destination in a load guide by using the selected POI.

According to still another aspect of the present invention, provided is a method for selecting a target at a touch point on a touch screen of a mobile device, the method including displaying local information items on an image in an overlay manner; when there is a touch on the touch screen, checking the number of the local information items overlapped with the touch point; if two or more local information items are overlapped with the touch point, enlarging and displaying the local information items overlapped with the touch point; if a single one of the enlarged local information items is overlapped with the touch point, selecting the single local information item among the enlarged local information items; and displaying detail information of the selected local information item.

BRIEF DESCRIPTION OF THE DRAWINGS

The above and other aspects, advantages, and salient features of the invention will become apparent to those skilled in the art from the following detailed description, when taken in conjunction with the accompanying drawings, in which.

DETAILED DESCRIPTION OF EMBODIMENTS OF THE PRESENT INVENTION

Non-limiting embodiments of the present invention are described in detail with reference to the accompanying drawings. In the following description, the matters defined in the description are provided to assist a comprehensive understanding of the present invention, and it is obvious to those of ordinary skill in the art that predetermined modifications or changes of the matters described herein can be made without departing from the scope of the invention.

Furthermore, well-known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Figure 1:
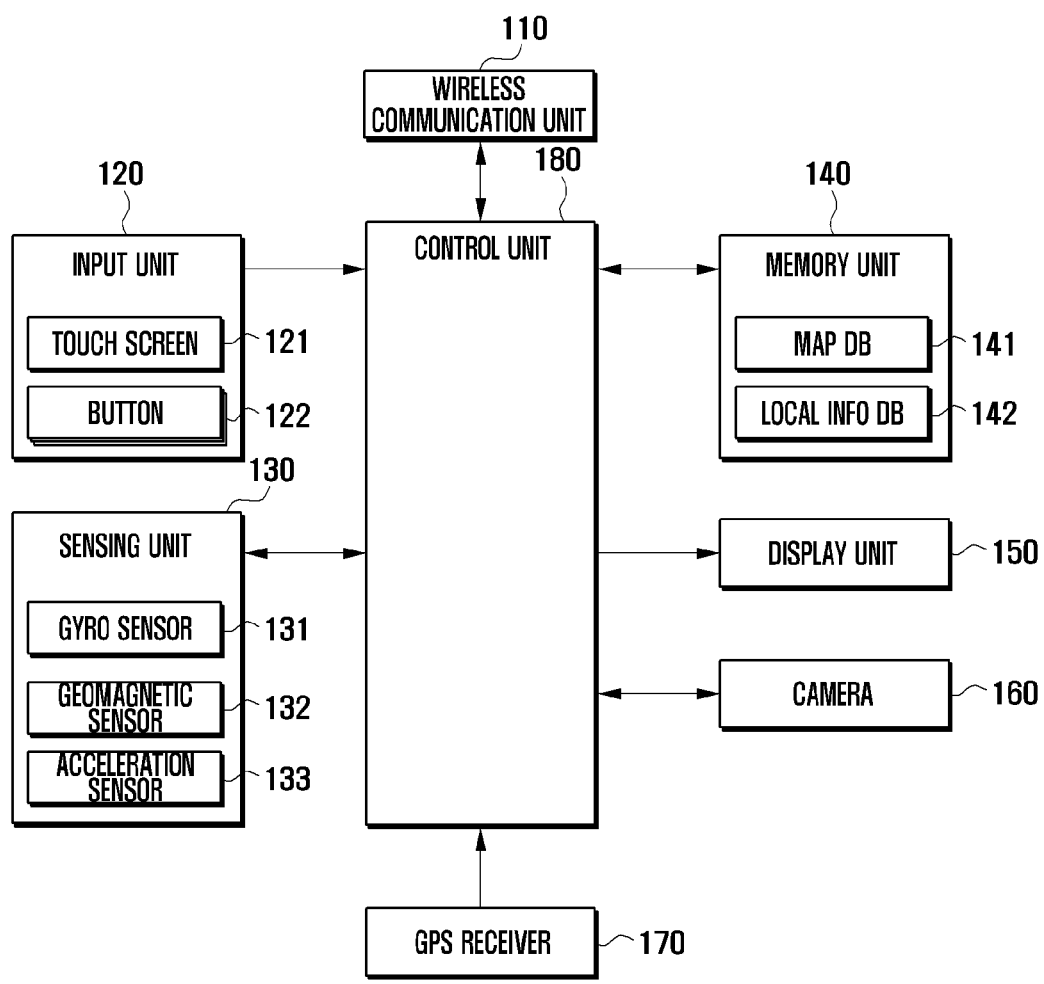
FIG. 1 is a block diagram illustrating a mobile device in accordance with an embodiment of the present invention.

FIG. 1 is a block diagram illustrating a mobile device in accordance with an embodiment of the present invention. As shown in FIG. 1, the mobile device may include a wireless communication unit 110, an input unit 120, a sensing unit 130, a memory unit 140, a display unit 150, a camera 160, a Global Positioning System (GPS) receiver 170, and a control unit 180 that generally controls the other units of the mobile terminal.

The wireless communication unit 110 includes a mobile communication module (not shown) that wirelessly communicates with a base station (not shown) in order to provide data received from the control unit 180 to the base station or provide data received from the base station to the control unit 180. Additionally, the wireless communication unit 110 may have a WiFi module in order to access to a Local Area Network (LAN).

The input unit 120 is includes a touch screen 121 and a plurality of buttons 122. The input unit 120 outputs, to the control unit 180, a touch event or a key event caused by user input.

The sensing unit 130 detects the direction, attitude angle, etc. of the mobile device and outputs detection results to the control unit 180. The sensing unit 130 may have a gyro sensor 131, a geomagnetic sensor 132, and/or an acceleration sensor 133. As well known in the art, the gyro sensor 131 measures the attitude angles of the mobile device in the X-axis, Y-axis and Z-axis directions, and also detects a rotation on each axis, namely rolling on the X-axis, pitching on the Y-axis, and yawing on the Z-axis. The geomagnetic sensor 132 detects the direction of the mobile device and may perform a tilt compensation function for the gyro sensor 132. The acceleration sensor 133 measures the acceleration of the mobile device.

The memory unit 140 may be divided into program and data regions (not shown). The program region may store an Operating System (OS), an augmented reality application for representing local information on an image (such as a realistic image, e.g., a digital photograph) in an overlay manner, a road guide application, a mobile web browser, and the like. The data region may store a map database 141, a local information database 142, etc.

The GPS receiver 170 offers GPS satellite information such as GPS satellite location, transmission time, reception time, satellite signal strength, etc. to the control unit 180.

Figure 2A:
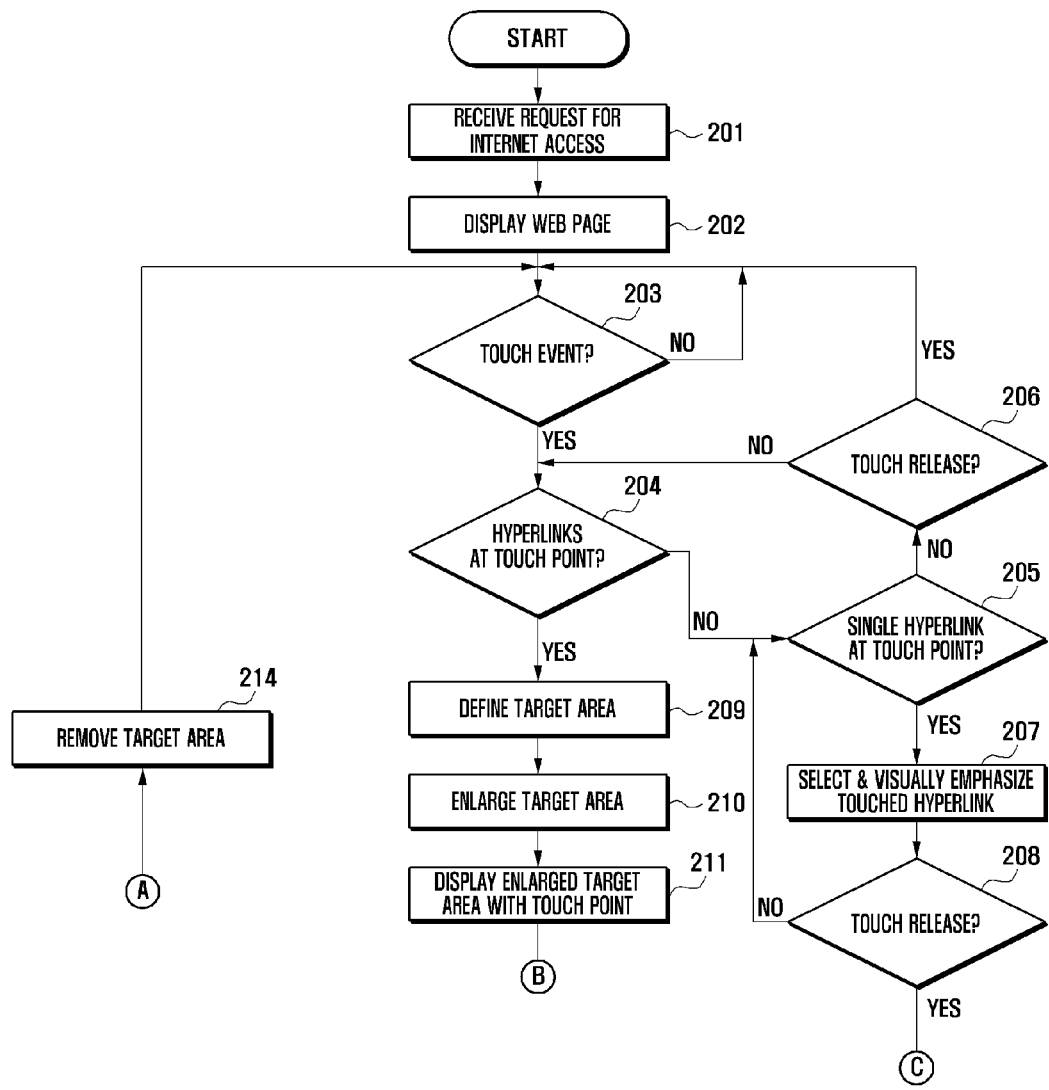
FIG. 2 is a flow diagram illustrating a method for selecting a target at a touch point in accordance with an embodiment of the present invention.
Figure 2B:
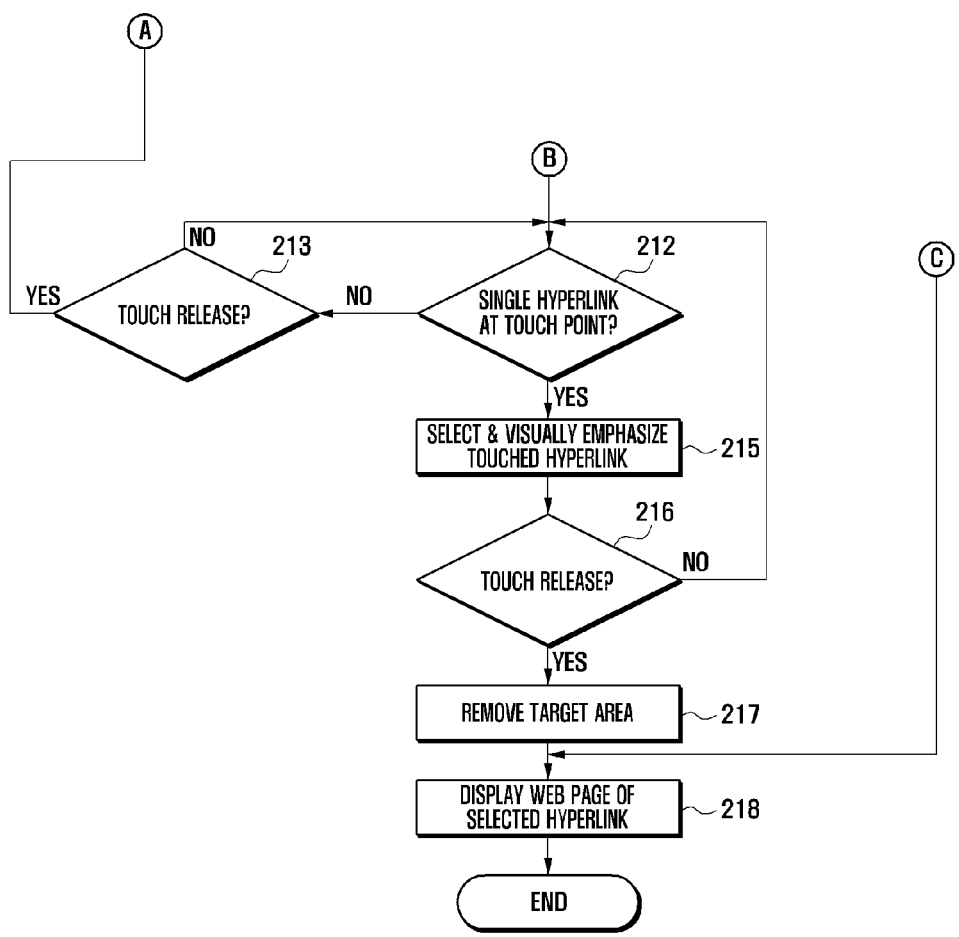
Figure 3:
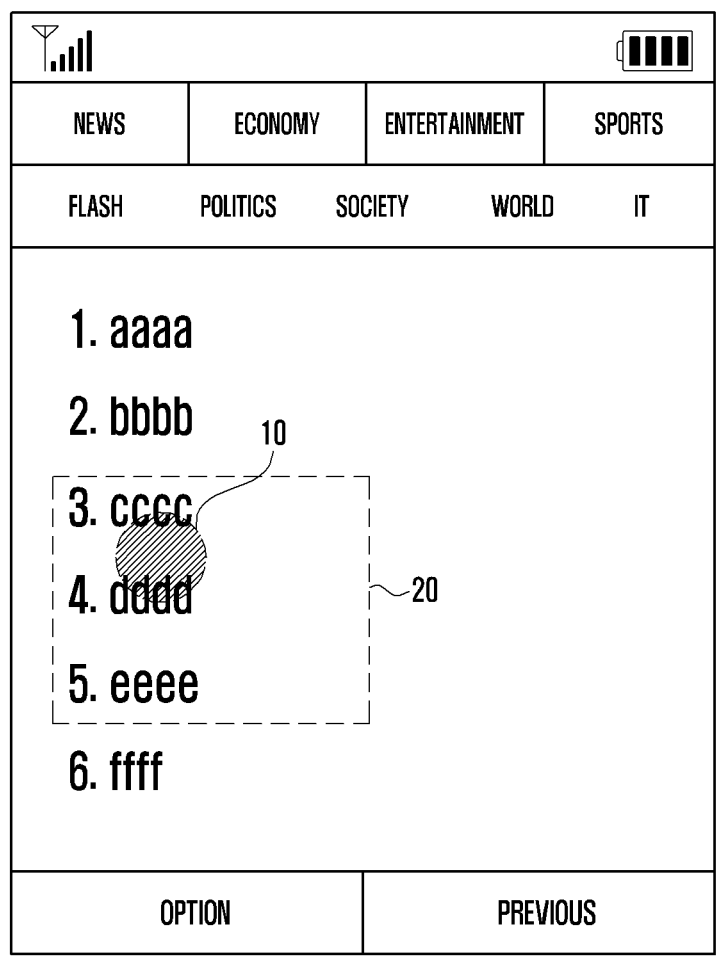
FIGS. 3 and 4 are screenshots illustrating selection of a hyperlink in FIG. 2 in accordance with an embodiment of the present invention.
Figure 4:
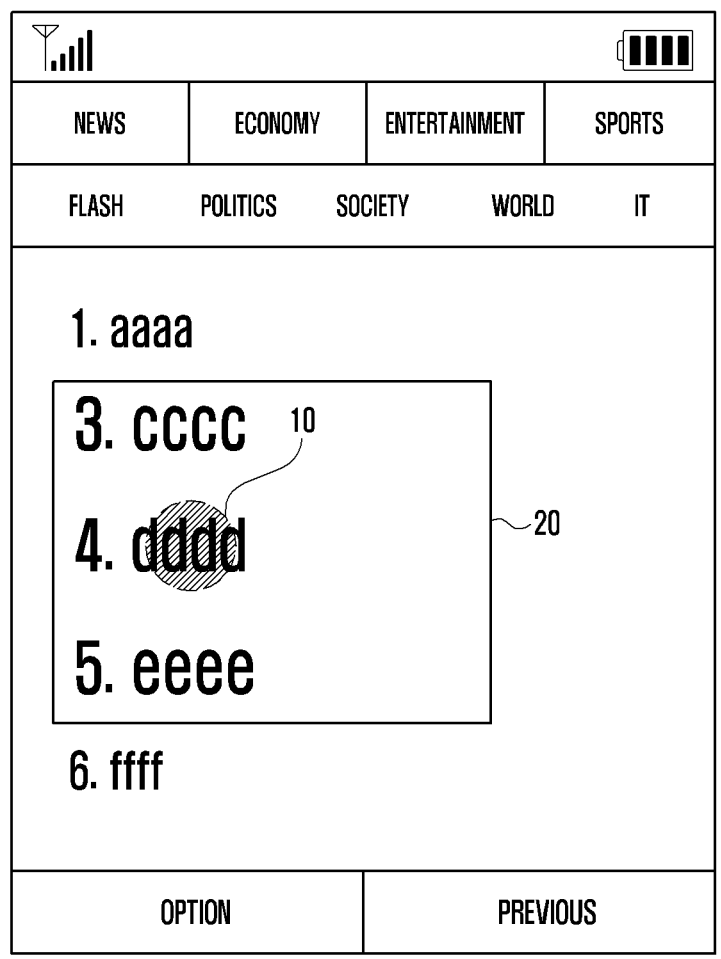

FIG. 2 is a flow diagram illustrating a method for selecting a target at a touch point in accordance with an embodiment of the present invention. Specifically, FIG. 2 illustrates a method for selecting a user's desired target among a plurality of hyperlinks overlapped with a touch point on the touch screen and then displaying a web page of the selected target. The process of FIG. 2 is performed by the control unit 180. Additionally, FIGS. 3 and 4 are screenshots illustrating selection of a hyperlink in accordance with the method of FIG. 2.

In step 201, the control unit 180 receives a request for Internet access and then establishes an Internet connection by controlling the wireless communication unit 110. For example, when a user touches a web browser icon, the touch screen 121 delivers a touch event to the control unit 180. Then, the control unit 180 controls the wireless communication unit 110 and accesses a predetermined web site.

In step 202, the control unit 180 controls the display unit 150 to display a web page received through the wireless communication unit 110. In step 203, the control unit 180 determines whether any touch event occurs. If a touch event occurs, the control unit 180 proceeds to steps 204 and 205 and then checks the number of hyperlinks overlapped with a touch point. If no hyperlink is overlapped with a touch point, the control unit 180 proceeds to step 206.

In step 206, the control unit 180 determines whether a touch is released. If so, the control unit 180 returns to step 203. However, if a touch is not yet released, namely if a user keeps the finger touched on the touch screen 121 or takes a drag action (i.e., moves the finger across the touch screen while maintaining a touch), a touch event still continues. Therefore, the control unit 180 returns to step 204.

If the only one hyperlink is overlapped with a touch point as the result of the check performed in steps 204 and 205, the control unit 180 proceeds to step 207. In step 207, the control unit 180 selects and visually emphasizes a touched hyperlink among displayed hyperlinks. For example, by controlling the display unit 150, the control unit 180 makes a clear distinction in size, transparency or color between the touched hyperlink and the other hyperlinks. Next, in step 208, the control unit 180 determines whether a touch is released. If so, the control unit 180 proceeds to step 218, which is described in detail below. If a touch is not released, the control unit 180 returns to step 205 and checks again whether a single hyperlink is still overlapped with a touch point. The method returns to step 205 because a drag may cause a touch on several hyperlinks or on no hyperlinks. If a single hyperlink is overlapped with a touch point as the result of check in step 205, namely, if a touched hyperlink only is still touched or if any other single hyperlink is alternatively touched, the control unit 180 proceeds again to step 207. Otherwise the control unit 180 proceeds again to step 206.

If two or more hyperlinks are overlapped with a touch point 10 as the result of the check in step 204, the control unit 180 proceeds to step 209 and defines a target area 20 to be enlarged around the touch point 10 as shown in FIG. 3. For instance, the control unit 180 defines the target area 20 that surrounds the touch point 10 and contains all hyperlinks overlapped with the touch point 10. Next, the control unit 180 enlarges the target area 20 at a given ratio in step 210 and then, as shown in FIG. 4, displays the enlarged target area 20 together with the touch point 10 in an overlay manner in step 211. Particularly, the touch point is unchanged in size, whereas hyperlinks in the target area are enlarged. Therefore, even though a user does not move the finger, there is a high probability that the only one hyperlink will be touched. Next, in step 212, the control unit 180 checks whether a single hyperlink only is overlapped with the touch point.

If two or more hyperlinks are overlapped with the touch point or if no hyperlink is overlapped with the touch point as the result of check in step 212, the control unit 180 proceeds to step 213 and determines whether a touch is released. If so, the control unit 180 removes the displayed target area 20 in step 214 and then returns to step 203. If a touch is not yet released, the control unit 180 returns to step 212. However, if the touch point 10 gets out of the target area 20 due to a drag, the control unit 180 does not return to step 212 but proceeds to step 214.

If only a single hyperlink is determined to be overlapped with the touch point as the result of check in step 212, the control unit 180 selects and visually emphasizes a touched hyperlink among displayed hyperlinks in step 215 as earlier discussed in step 207. Next, in step 216, the control unit 180 determines whether a touch is released.

If a touch is not released, the control unit 180 returns to step 212. If a touch is released, the control unit 180 removes the displayed target area 20 in step 217 and then proceeds to step 218.

In step 218, the control unit 180 controls the wireless communication unit 110 to download a web page corresponding to the hyperlink selected in step 215 or 207. Then the control unit 180 controls the display unit 150 to display the downloaded web page.

Figure 5A:
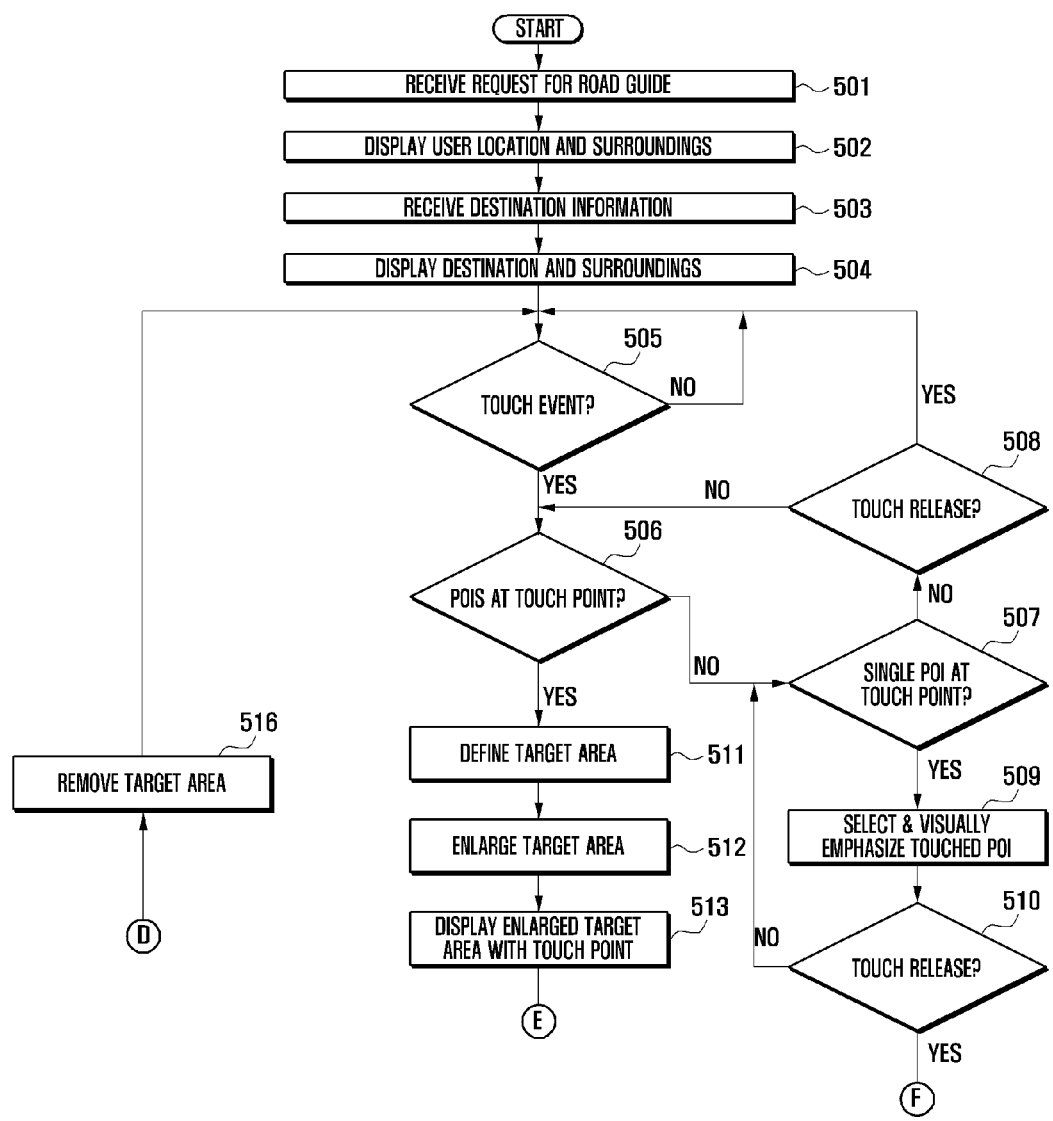
FIG. 5 is a flow diagram illustrating a method for selecting a target at a touch point in accordance with another embodiment of the present invention.
Figure 5B:
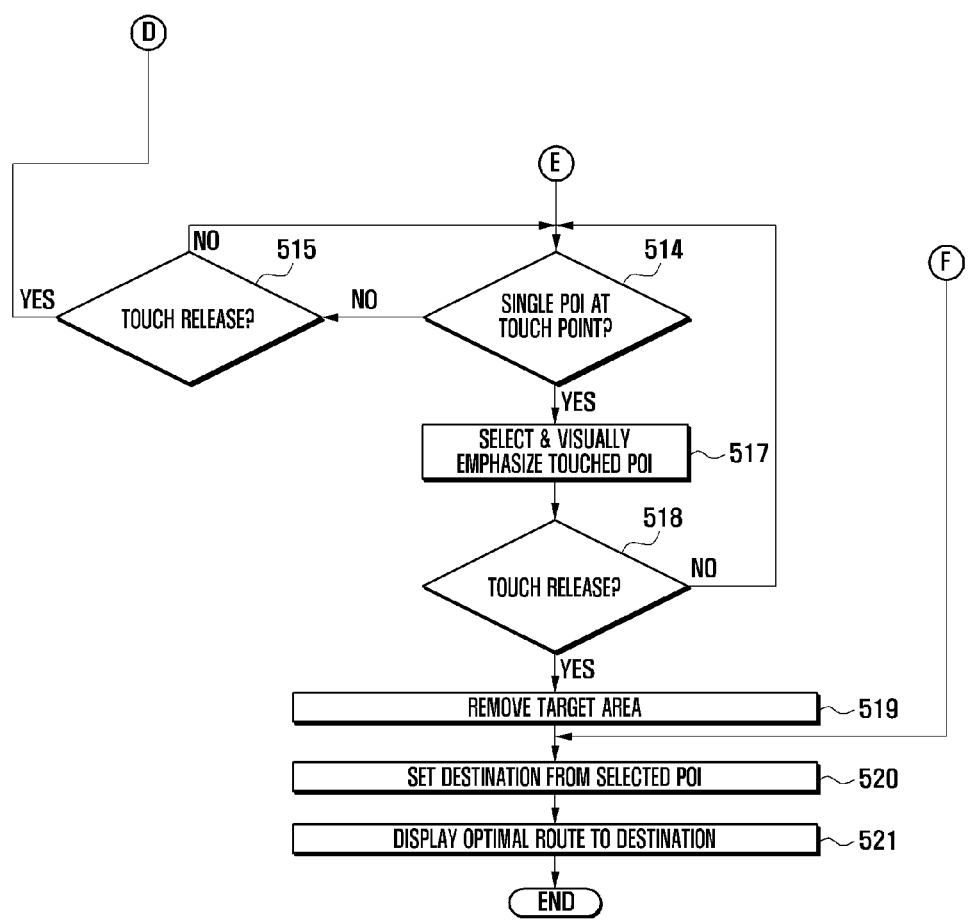
Figure 6:
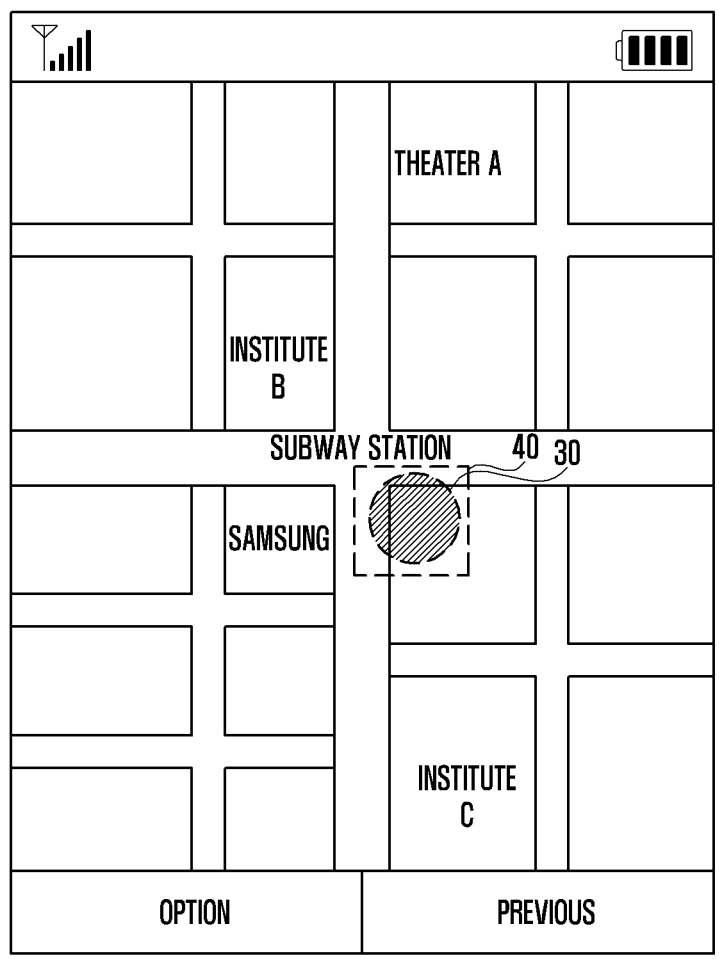
FIGS. 6 and 7 are screenshots illustrating selection of a point of interest in FIG. 5 in accordance with an embodiment of the present invention.
Figure 7:
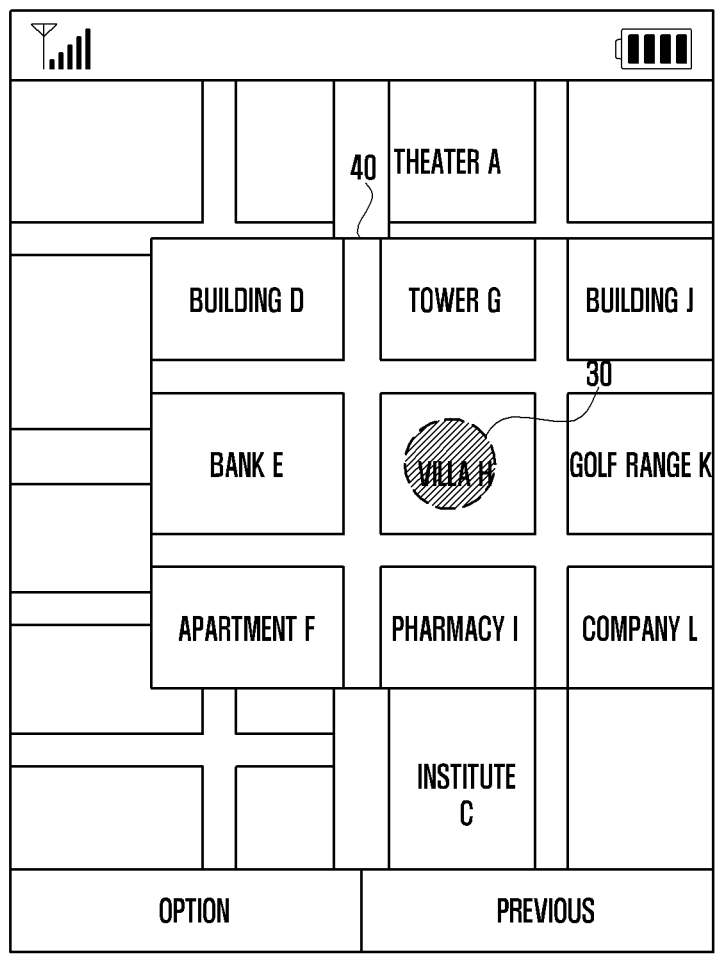

FIG. 5 is a flow diagram illustrating a method for selecting a target at a touch point in accordance with another embodiment of the present invention. Specifically, FIG. 5 illustrates a method for selecting a user's desired target from among a plurality of Points of Interest (POIs) overlapped with a touch point on the touch screen and then setting the destination in a road guide from the selected target. Herein, POIs refer to major facilities on a map, such as a station, an airport, a terminal, a hotel, a building, a theater, etc. Such POIs are selectively displayed in stages according to the scale of a map. For example, buildings and theaters may only be shown in a map having the scale greater than 1 cm/100 m. The method illustrated in FIG. 5 is performed by the control unit 180. Additionally, FIGS. 6 and 7 are screenshots illustrating selection of a point of interest in FIG. 5.

In step 501, the control unit 180 receives a request for a road guide. For instance, when a user touches a navigation icon, the touch screen 121 delivers a touch event to the control unit 180. Then the control unit 180 controls the GPS receiver 170 and receives GPS satellite information from GPS satellites. Additionally, the control unit 180 measures a user's current position, namely, the location of the mobile device, by using the received GPS satellite information and then proceeds to step 502. Alternatively, the control unit 180 may obtain the location of the mobile device by using WiFi Positioning System (WPS) or Cellular Network Positioning System (CPS) instead of GPS. Since WPS and CPS are well known in the art, detailed descriptions of these systems are omitted for clarity and conciseness.

In step 502, the control unit 180 controls the display unit 150 to display a user's current location. Specifically, the control unit 180 searches the map database 141 and checks whether there is map information corresponding to the current location. If map information corresponding to the current location is found, the control unit 180 reads such map information from the map database 141 and then displays the map information. If no map information is found, the control unit 180 controls the wireless communication unit 110 and sends a request for map information to a map provider server. Then the control unit 180 receives the requested map information, displays the received map information on the display unit 150 and also saves the received map information in the map database 141.

Next, in step 503, the control unit 180 receives destination information from a user. For instance, a user may enter destination information through a virtual keyboard displayed on the touch screen 121. Additionally, in step 504, the control unit 180 controls the display unit 150 to display the destination and a surrounding area. Namely, the control unit 180 reads map information corresponding to the destination from the map database 141 and then displays the map information on the display unit 150. If no map information is found, the control unit 180 downloads map information from the server.

Next, in step 505, the control unit 180 determines whether any touch event occurs. If a touch event occurs, the control unit 180 proceeds to steps 506 and 507 and then checks the number of POIs overlapped with a touch point. If no POI is overlapped with a touch point, the control unit 180 proceeds to step 508. In step 508, the control unit 180 determines whether a touch is released. If a touch is released, the control unit 180 returns to step 505. However, if a touch is not yet released, the control unit 180 returns to step 506.

If only one POI is determined as overlapping with a touch point as the result of check in steps 506 and 507, the control unit 180 proceeds to step 509. In step 509, the control unit 180 selects and visually emphasizes a touched POI among displayed POIs. For instance, by controlling the display unit 150, the control unit 180 performs a clear distinction in size, transparency or color between the touched POI and the other POIs.

Next, in step 510, the control unit 180 determines whether a touch is released. If a touch is released, the control unit 180 proceeds to step 520, which is described in further detail below. If a touch is not released, the control unit 180 returns to step 507 and re-checks whether a single POI is still overlapped with a touch point. This recheck is performed because a drag may cause a touch on several POIs or no POIs. If a single POI is determined as overlapping with a touch point as the result of check in step 507, the control unit 180 returns to step 509. Otherwise, the control unit 180 returns to step 508.

If at least two POIs are determined as overlapping with a touch point 30 in step 506, the control unit 180 proceeds to step 511 and defines a target area 40 to be enlarged around the touch point 30 as shown in FIG. 6. Next, the control unit 180 enlarges the target area 40 at a given ratio in step 512 and then, as shown in FIG. 7, displays the enlarged target area 40 together with the touch point 30 as an overlay in step 513. Next, in step 514, the control unit 180 checks whether only a single POI is overlapped with the touch point.

If at least two POIs are determined as being overlapped with the touch point or if no POI is overlapped with the touch point, as the result of check in step 514, the control unit 180 proceeds to step 515 and determines whether a touch is released. If a touch is released, the control unit 180 removes the displayed target area 40 in step 516 and then returns to step 505. If a touch is not yet released, the control unit 180 returns to step 514. However, if the touch point 10 moves out of the target area 40 due to a drag, the control unit 180 does not return to step 514, but instead proceeds to step 516.

If only a single POI is determined as being overlapped with the touch point, as the result of check in step 514, the control unit 180 selects and visually emphasizes a touched POI among the displayed POIs in step 517, such as previously discussed with respect to step 509. Next, in step 518, the control unit 180 determines whether a touch is released. If a touch is not released, the control unit 180 returns to step 514. If a touch is released, the control unit 180 removes the displayed target area 40 in step 519, and then proceeds to step 520.

In step 520, the control unit 180 sets the destination in a road guide by using the POI selected in step 517 or 509. Specifically, the control unit 180 controls the display unit 150 to output a query message about whether to set the destination. If any touch signal indicating a "yes" is received from the input unit 121 in response to the query message, the control unit 180 sets the destination in a road guide by using the POI selected in step 517 or 509. Next, in step 521, the control unit 180 computes an optimal route from a user's current location to the destination and then displays the optimal route on the display unit 150.

Figure 8A:
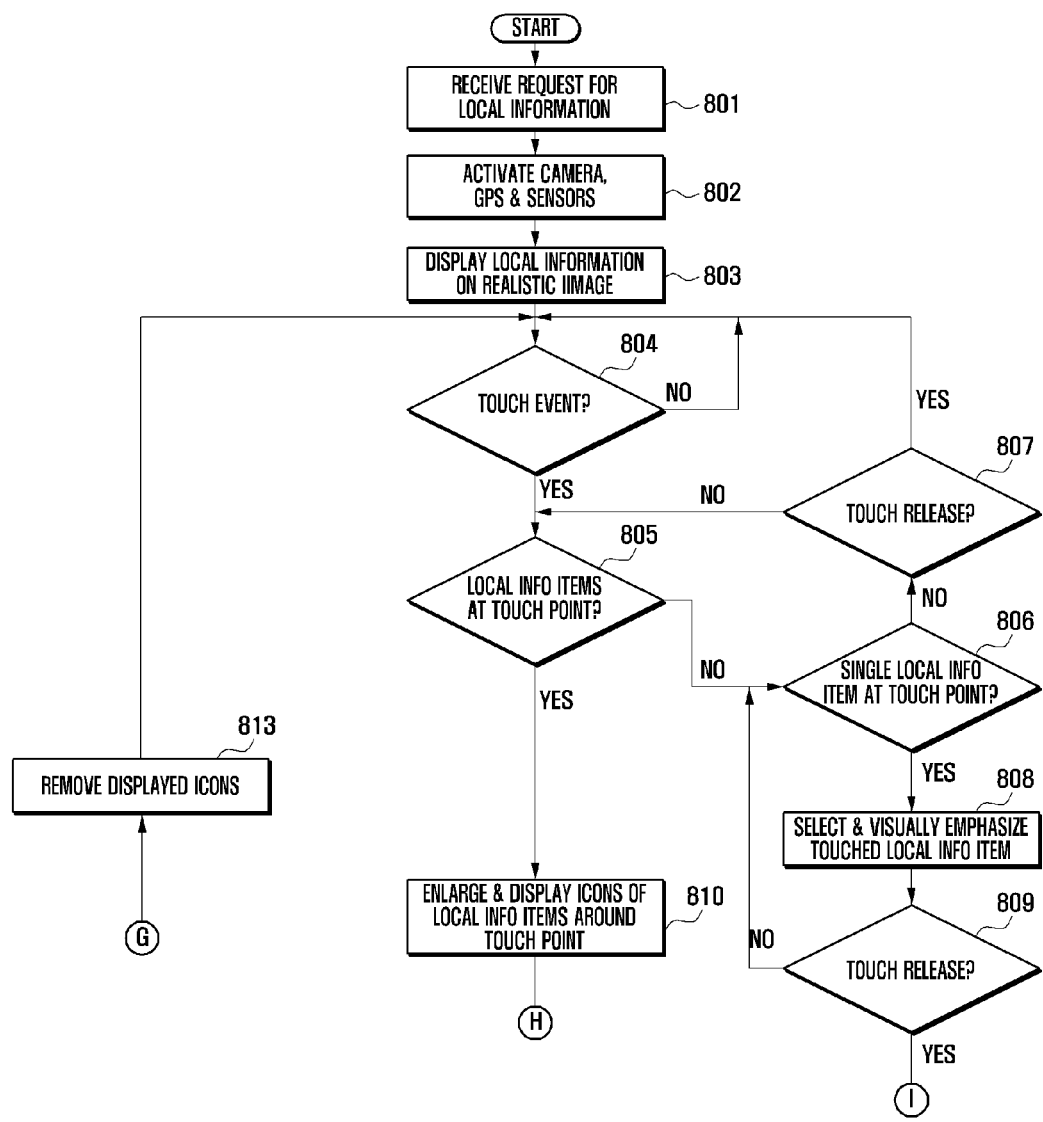
FIG. 8 is a flow diagram illustrating a method for selecting a target at a touch point in accordance with still another embodiment of the present invention.
Figure 8B:
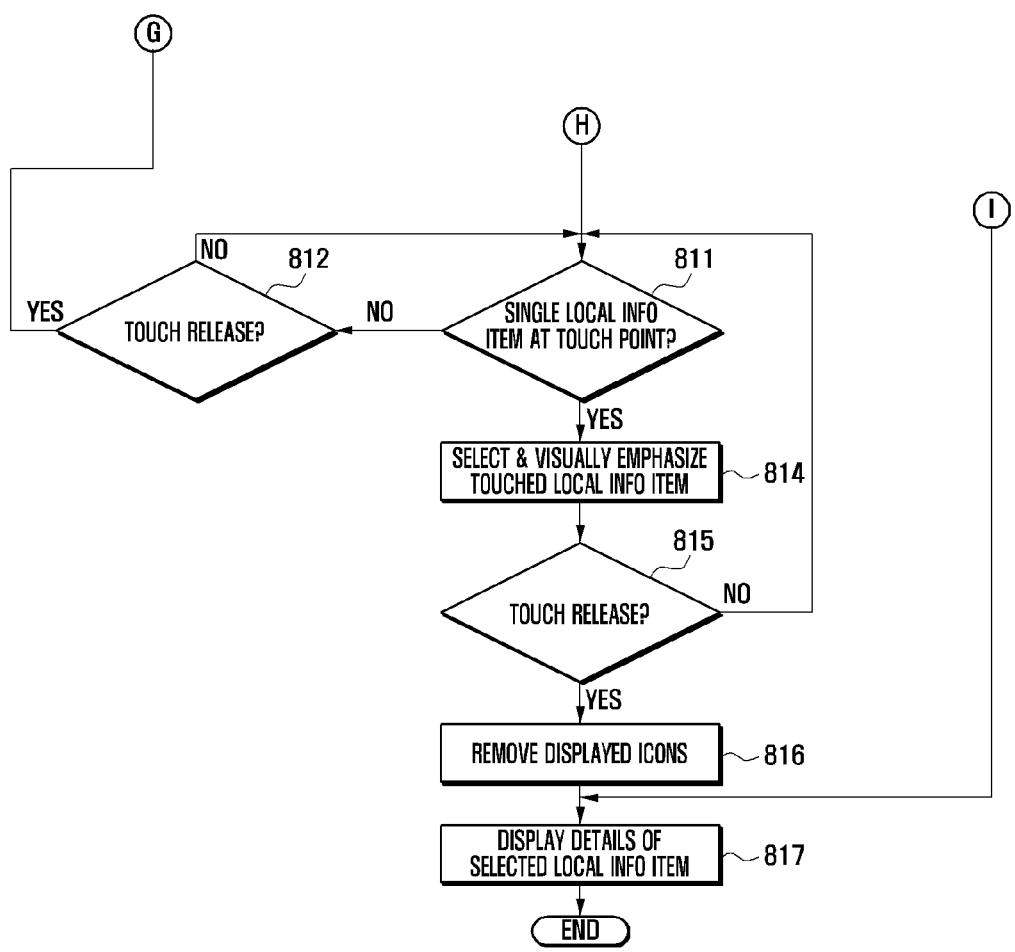
Figure 9:
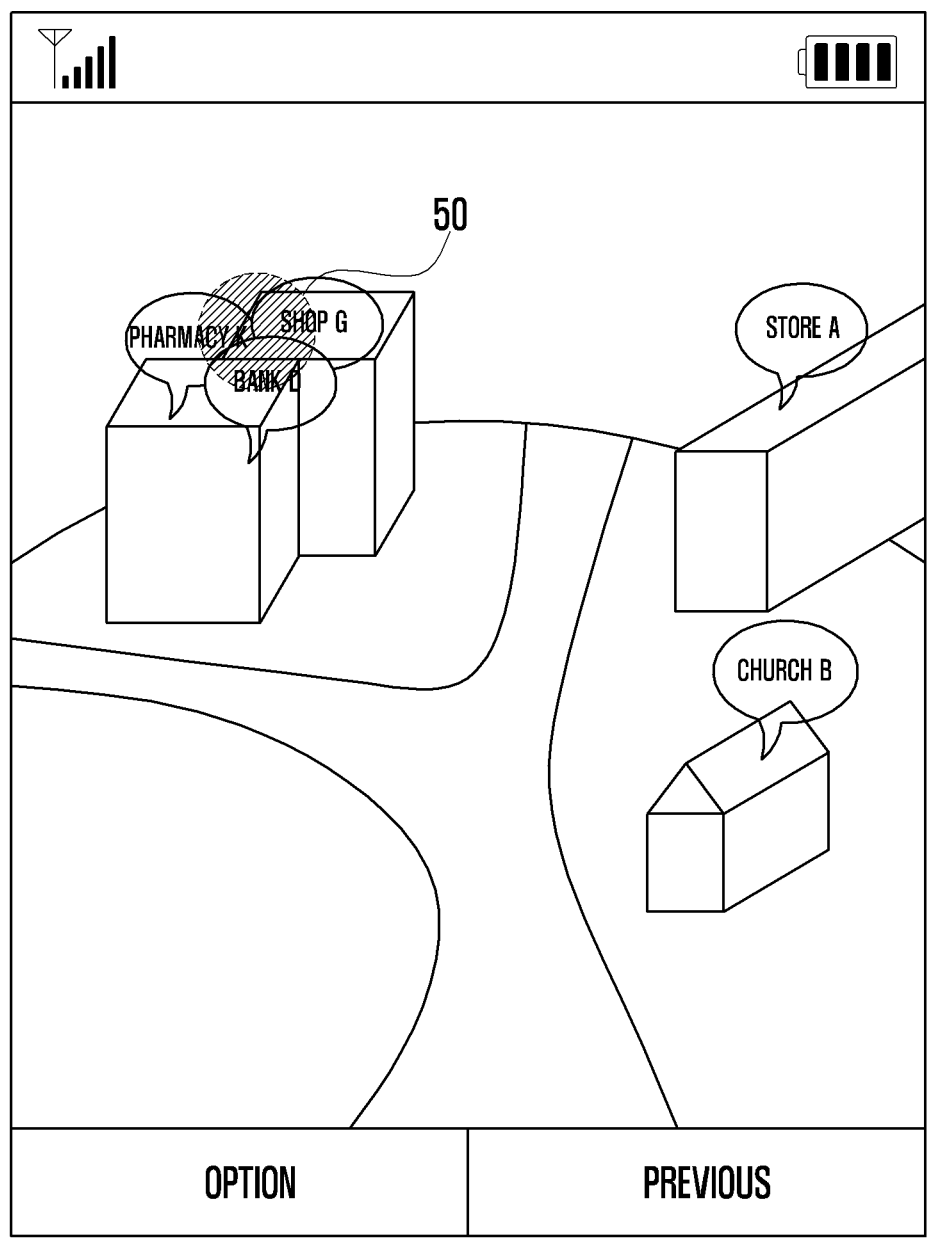
FIGS. 9 and 10 are screenshots illustrating selection of local information in FIG. 8 in accordance with an embodiment of the present invention.
Figure 10:
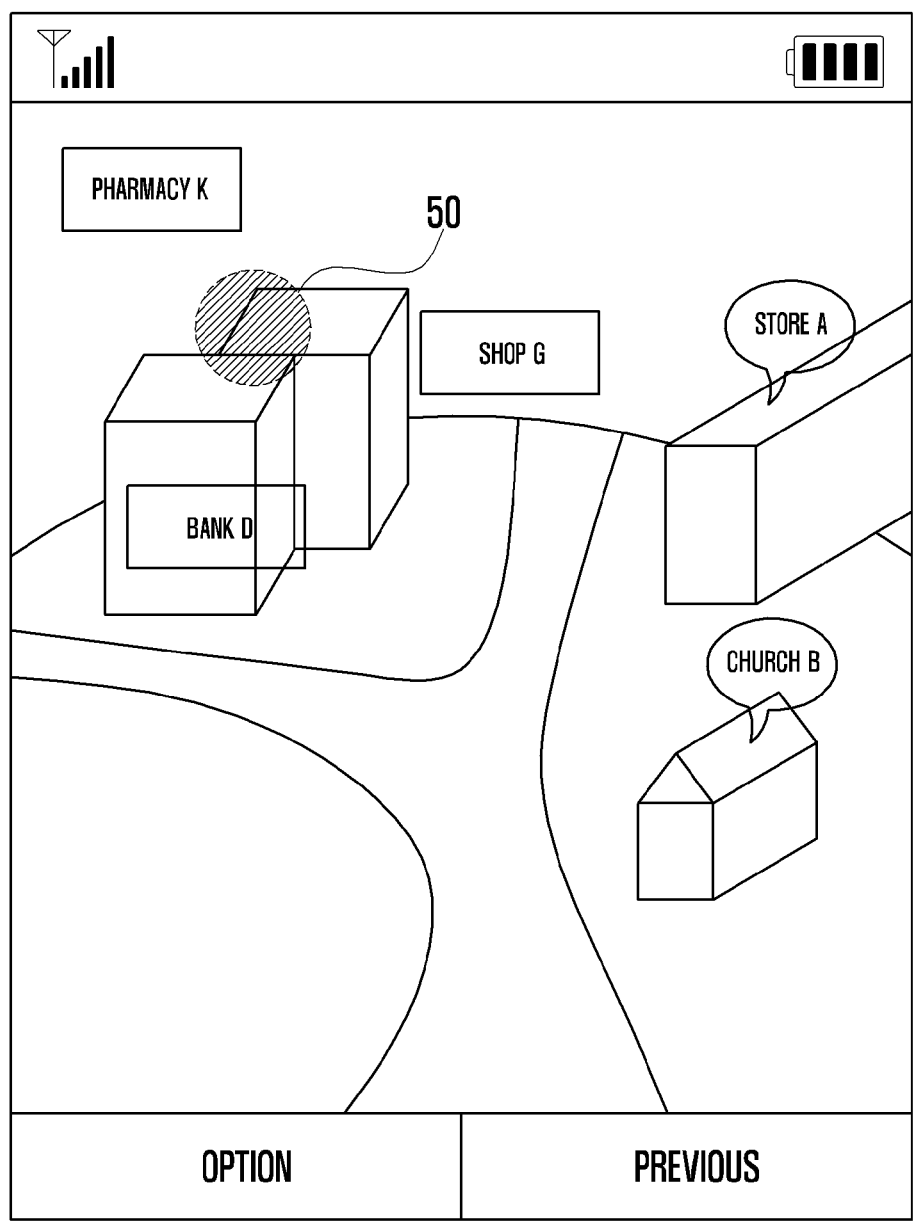

FIG. 8 is a flow diagram illustrating a method for selecting a target at a touch point in accordance with still another embodiment of the present invention. Particularly, this embodiment is related to an augmented reality application that represents, through an overlay, local information corresponding to an image taken by the camera 160. Specifically, FIG. 8 shows a method for selecting a user's desired target from among a plurality of local information items overlapped with a touch point on the touch screen and then displaying the details of the selected target. The process shown in FIG. 8 is performed by the control unit 180. Additionally, FIGS. 9 and 10 are screenshots illustrating selection of local information in FIG. 8.

In step 801, the control unit 180 receives a request for local information. For instance, when a user touches an augmented reality icon, the touch screen 121 delivers a touch event to the control unit 180. Next, in step 802, the control unit 180 activates the camera 160 to display an image. Also, the control unit 180 activates the GPS receiver 170 and the sensors 131, 132 and 133 and then, by using information received from them, measures the location, direction, and attitude angle of the mobile device.

Next, in step 803, the control unit 180 controls the display unit 150 to display local information items as an overlay on the image. Specifically, the control unit 180 retrieves local information items from the local information database 142 in consideration of the location, direction, and attitude angle. If there is no local information item corresponding to the location, direction, and attitude angle in the local information database 142, the control unit 180 downloads necessary local information from a server.

Next, in step 804, the control unit 180 determines whether any touch event occurs. If a touch event occurs, the control unit 180 proceeds to steps 805 and 806 and then checks the number of local information items overlapped with a touch point. If no local information item is overlapped with a touch point, the control unit 180 proceeds to step 807. In step 807, the control unit 180 determines whether a touch is released. If so, the control unit 180 returns to step 804. However, if a touch is not yet released, the control unit 180 returns to step 805.

If the single local information item is determined to be overlapped with a touch point, as the result of check in steps 805 and 806, the control unit 180 proceeds to step 808. In step 808, the control unit 180 selects and visually emphasizes a touched local information item among displayed local information items. For instance, by controlling the display unit 150, the control unit 180 makes a clear distinction in size, transparency or color between the touched local information item and the other local information items. Next, in step 809, the control unit 180 determines whether a touch is released. If the touch is released, the control unit 180 proceeds to step 817, which is described in detail below. If a touch is not released, the control unit 180 returns to step 806 and re-checks whether a single local information item is still overlapped with a touch point. If a single item is determined to be overlapped with a touch point, as the result of check in step 806, the control unit 180 proceeds again to step 808. If the single item is not overlapped with the touch point, the control unit 180 proceeds to step 807 as also discussed above.

If at least two information items are determined to be overlapped with a touch point 50, as the result of check in step 805, as shown in FIG. 9, the control unit 180 proceeds to step 810, enlarges such local information items, and displays the local information items in the form of icons around the touch point 50 as shown in FIG. 10. Next, in step 811, the control unit 180 checks whether only a single local information item is overlapped with the touch point.

If at least two local information items are overlapped with the touch point or if no local information item is overlapped with the touch point as the result of check in step 811, the control unit 180 proceeds to step 812 and determines whether a touch is released. If the touch is released, the control unit 180 removes the displayed icons in step 813 and then returns to step 804. If a touch is not yet released, the control unit 180 returns to step 811.

If only a single local information item is overlapped with the touch point as the result of check in step 811, the control unit 180 selects and visually emphasizes a touched local information item among displayed items in step 814 as earlier discussed in step 808. Next, in step 815, the control unit 180 determines whether a touch is released. If a touch is not released, the control unit 180 returns to step 811. If a touch is released, the control unit 180 removes the displayed icons in step 816 and then proceeds to step 817.

In step 817, the control unit 180 displays the details of the local information item selected in step 814 or 808, such as a distance from a user's current location to the selected local information, a phone number, etc. Specifically, the control unit 180 retrieves detailed information from the local information database 142 and outputs the detailed information to the display unit 150. If there is no detailed information in the local information database 142, the control unit 180 downloads detailed information from a server and outputs the downloaded information to the display unit 150.

While this invention has been particularly shown and described with reference to an embodiment thereof, it will be understood by those skilled in the art that various changes in form and details may be made therein without departing from the spirit and scope of the invention as defined by the appended claims.

What is claimed is:

1. A method for selecting a target on a touch screen of a mobile device, the method comprising:
    displaying a first web page on the touch screen;
    receiving a touch input on the touch screen;
    determining whether at least two hyperlinks are overlapped with a touch point of the touch input in the displayed web page;
    defining a target area around the touch point if the at least two hyperlinks are around the touch point;
    enlarging the defined target area in the displayed web page and displaying the enlarged target area with visual emphasis on a touched hyperlink among the at least two hyperlinks contained in the enlarged target area;
    selecting a single hyperlink among the at least two hyperlinks contained in the enlarged target area;
    downloading a second web page corresponding to the selected hyperlink; and
    displaying the downloaded second web page on the touch screen.

2. The method of claim 1, further comprising:
    displaying, when the touch input is released from the touch screen after the single hyperlink is selected, a web page corresponding to the selected hyperlink.

3. The method of claim 2, further comprising:
    removing, when the touch input is released from the touch screen while no hyperlinks or at least two hyperlinks in the enlarged target area are overlapped with the touch point, the displayed target area.

4. The method of claim 1, further comprising:
    selecting and visually emphasizing if a single one of hyperlinks in the enlarged target area is overlapped with the touch point, the single hyperlink.

5. A mobile device comprising:
    a wireless communication unit;
    a touchscreen; and
    a control unit electronically connected to the touchscreen and the wireless communication unit,
    wherein the control unit is configured to:
        display a first web page on the touch screen;
        receive a touch input on the touch screen;

determine whether at least two hyperlinks are overlapped with a touch point of the touch input in the displayed web page;
define a target area around the touch point if the at least two hyperlinks are around the touch point;
enlarge the defined target area in the displayed web page and display the enlarged target area with visual emphasis on a touched hyperlink among the at least two hyperlinks contained in the enlarged target area;
select a single hyperlink among the at least two hyperlinks contained in the enlarged target area
control the communication unit to download a second web page corresponding to the selected hyperlink; and
display the downloaded second web page on the touchscreen.

6. The mobile device of claim 5, wherein the control unit is further configured to select and visually emphasize, if a single one of hyperlinks in the enlarged target area is overlapped with the touch point, the single hyperlink.

7. The mobile device of claim 6, wherein the control unit is further configured to display, when the touch input is released from the touch screen after the single hyperlink is selected, a web page corresponding to the selected hyperlink.

8. The mobile device of claim 7, wherein the control unit is further configured to remove, when the touch input is released from the touch screen while no hyperlinks or at least two hyperlinks in the enlarged target area are overlapped with the touch point, the displayed target area.

* * * * *